United States Patent
Swayhoover et al.

(10) Patent No.: US 6,330,992 B1
(45) Date of Patent: Dec. 18, 2001

(54) DEVICE FOR SUPPORTING A CAMERA ON A SURFACE

(76) Inventors: Robert D. Swayhoover; Patricia A. Swayhoover, both of 87-08 Justice Ave., Apt. 11E, Elmhurst, NY (US) 11373

( * ) Notice: Subject to any disclaimer, the term of this patent is extended or adjusted under 35 U.S.C. 154(b) by 0 days.

(21) Appl. No.: 09/476,169

(22) Filed: Dec. 30, 1999

(51) Int. Cl.[7] .............. A47B 96/06; E04G 3/00; F16B 1/00; G09F 7/18
(52) U.S. Cl. ........................................ 248/230.8
(58) Field of Search ................. 248/230.8, 632, 248/633, 634, 205.2, 214, 228.8, 346.2, 176.1

(56) References Cited

U.S. PATENT DOCUMENTS

| | | | |
|---|---|---|---|
| D. 302,561 | 8/1989 | Goins | D16/242 |
| D. 312,650 | 12/1990 | Charrier | D16/242 |
| D. 323,668 | 2/1992 | Schwartz et al. | D16/242 |
| D. 358,832 | 5/1995 | Lenney et al. | D16/242 |
| D. 363,945 | 11/1995 | LaBree | D16/242 |
| D. 376,611 | 12/1996 | Field | D16/242 |
| 4,162,696 | 7/1979 | Sprung | 150/52 J |
| 4,501,401 | 2/1985 | Conee | 248/346 |
| 4,606,524 | 8/1986 | Conee | 248/346 |
| 5,350,147 | 9/1994 | Paganus | 248/346 |
| 5,743,500 * | 4/1998 | Northway et al. | 248/146 |
| 5,810,313 | 9/1998 | Armstrong | 248/346.2 |
| 5,924,140 * | 7/1999 | Chi | 2/455 |
| 5,964,504 * | 10/1999 | Hogan et al. | 297/397 |
| 6,073,902 * | 6/2000 | Hiles | 248/346.2 |
| 6,145,508 * | 11/2000 | Seip, Jr. | 128/845 |

\* cited by examiner

Primary Examiner—Ramon O. Ramirez
Assistant Examiner—A. Joseph Wujciak
(74) Attorney, Agent, or Firm—Richard L Miller, P.A.

(57) ABSTRACT

A device for supporting a camera. The device includes a cushion, a strap, and apparatus. The cushion has a pocket disposed on the upper surface thereof, at one corner thereof. The upper surface of the strap has a first portion of hook and loop fasteners thereon that are disposed on the pair of free terminal ends of the strap. The lower surface of the strap has a second portion of hook and loop fasteners thereon that are disposed on the pair of free terminal ends of the strap. The second portion of hook and loop fasteners on one free terminal end of the strap releasably mates with the first portion of hook and loop fasteners on the other free terminal end of the strap so as to allow either free terminal end of the strap to overlap and engage the other free terminal end of the strap. The apparatus includes a third portion of hook and loop fasteners that is disposed on the upper surfaces of the cushion, a bolt for threadably engaging in the camera, and a fourth portion of hook and loop fasteners that covers the head of the bolt and releasably engages the third portion of hook and loop fasteners. The bolt is stored in the pocket on the upper surface of the cushion when not in use.

2 Claims, 1 Drawing Sheet

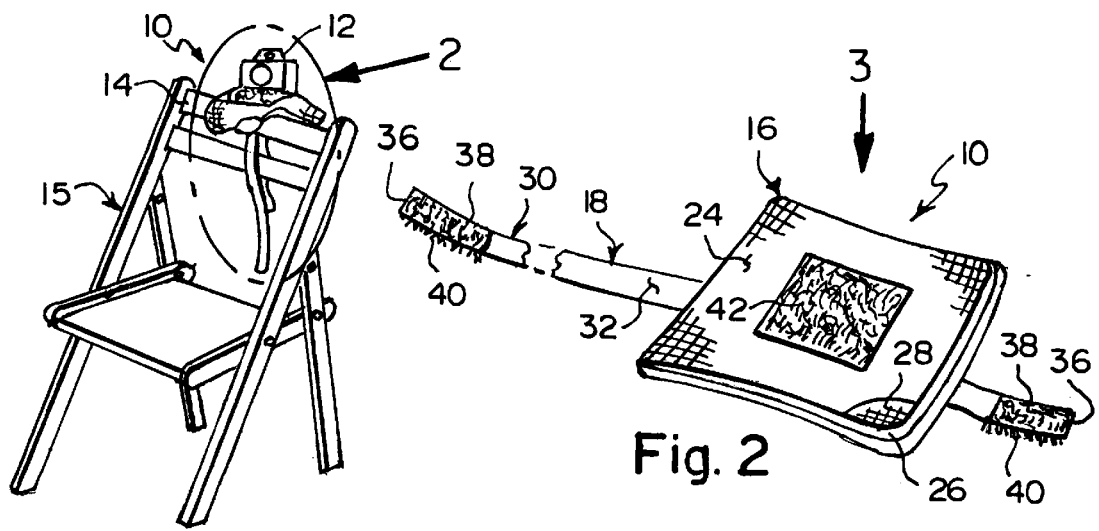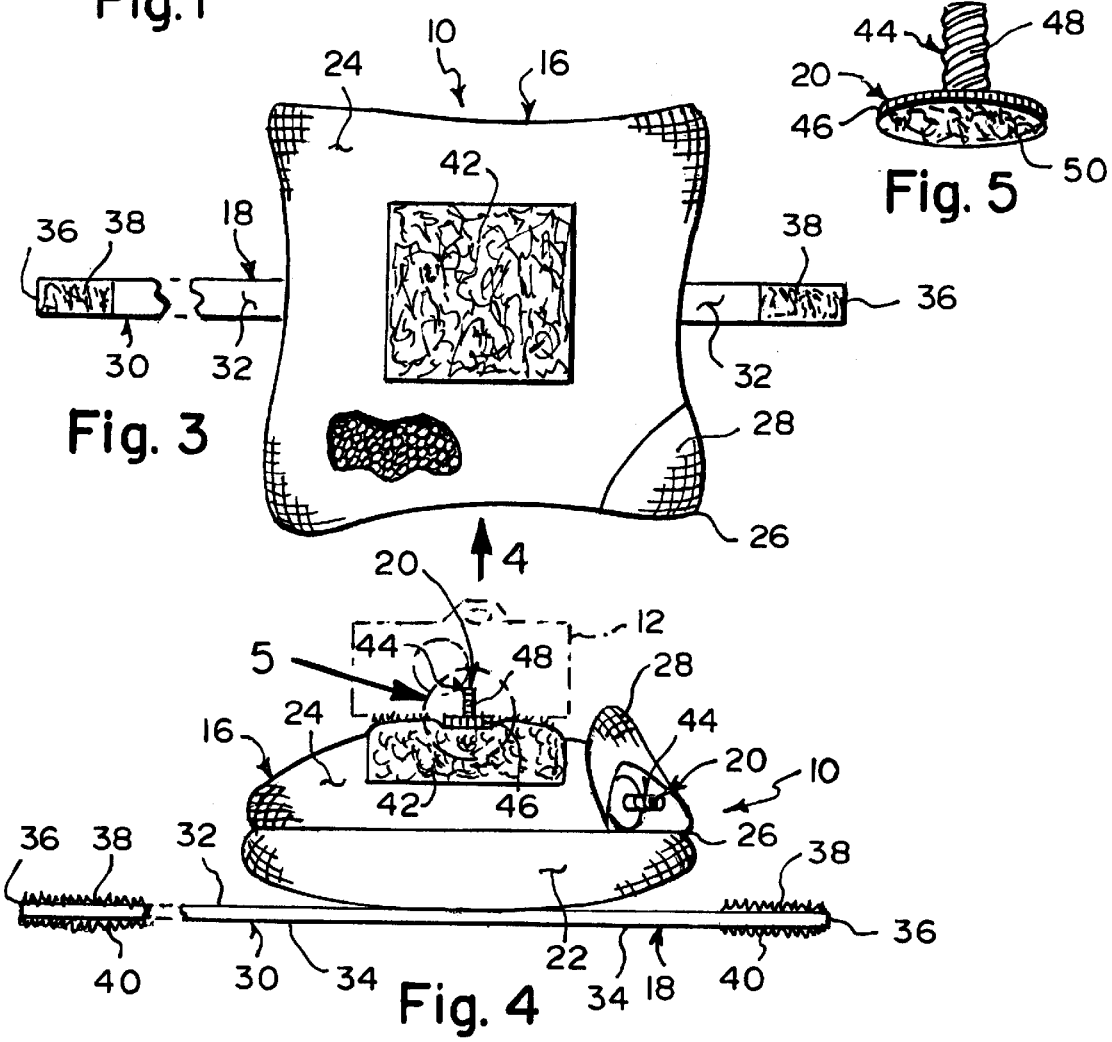

DEVICE FOR SUPPORTING A CAMERA ON A SURFACE

BACKGROUND OF THE INVENTION

1. Field of the Invention

The present invention relates to a support device. More particularly, the present invention relates to a device for supporting a camera on a surface.

2. Description of the Prior Art

Numerous innovations for support devices for cameras have been provided in the prior art that will be described. Even though these innovations may be suitable for the specific individual purposes to which they address, however, they differ from the present invention.

A FIRST EXAMPLE, U.S. Pat. No. Des. 302,561 to Goins teaches the ornamental design for a camera support.

A SECOND EXAMPLE, U.S. Pat. No. Des. 312,650 to Charrier teaches the ornamental design of a bean bag camera support.

A THIRD EXAMPLE, U.S. Pat. No. Des. 323,668 to Schwartz et al. teaches the ornamental design for a camera support.

A FOURTH EXAMPLE, U.S. Pat. No. Des. 358,832 to Lenney et al. teaches the ornamental design of a camera support and stabilizing system.

A FIFTH EXAMPLE, U.S. Pat. No. Des. 363,945 to LaBree teaches the ornamental design for a camera support for attachment to a tree or post.

A SIXTH EXAMPLE, U.S. Pat. No. Des. 376,611 to Field teaches the ornamental design for the camera support.

A SEVENTH EXAMPLE, U.S. Pat. No. 4,162,696 to Sprung teaches a deformable camera case, alternatively usable as a camera stand, that includes a wall in the form of a flexible cushion preferably filled with a plurality of small balls, that constitutes a pliable body capable of adjusting its shape to the contours of an object suitable for supporting the camera in a desired stable positions.

A EIGHTH EXAMPLE, U.S. Pat. No. 4,501,401 to Conee teaches a cushion for supporting a camera in a multiplicity of stable positions upon a wide variety of support surfaces. The cushion will generally be constructed of a fabric-like material, and will have internal walls dividing the internal space into a plurality of compartments. The compartments are filled with a free-flowing particulate solid material, thereby enabling the cushion to conform to the camera and to the surface upon which it is to be seated. Ideally, the cushion will have a "super elliptical" configuration, providing numerous stable positions and an ideal support surface for the camera, while minimizing the possibility of obstructing the view of the lens.

A NINTH EXAMPLE, U.S. Pat. No. 4,606,524 to Conee teaches a cushion for supporting a camera in a multiplicity of stable positions upon a wide variety of support surfaces. The cushion will generally be constructed of a fabric-like material, and will have internal members that tie together opposing portions of the cushion, in some embodiments also dividing the internal space into a plurality of compartments. The internal space is filled with a free-flowing particulate solid material, thereby enabling the cushion to conform to the camera and to the surface upon which it is to be seated. Ideally, the cushion will have a "super elliptical" configuration, providing numerous stable positions and an ideal support surface for the camera, while minimizing the possibility of obstructing the view of the lens.

A TENTH EXAMPLE, U.S. Pat. No. 5,350,147 to Paganus teaches an omnipositional pod for supporting a device such as a camera. The pod comprises a cushion for supporting the device, a fluid material contained within the cushion, a fastener mounted to the cushion being attachable to the device, and possibly a strap mounted to the cushion which creates a loop when fastened.

A ELEVENTH EXAMPLE, U.S. Pat. No. 5,810,313 to Armstrong teaches an adjustable camera support in the form of a rigid elongated plate which is centrally axially orificed to enable a bolt to be passed up through the plate at different locations and into the customary threaded orifice extending upwardly and inwardly into the underside of a camera. A rubber wash may be disposed on the bolt and interposed between the camera bottom and the top surface of the plate to hold the bolt in position on the plate. The unorificed portion of the underside of the plate is provided with VELCRO material, and engaging material is secured to the top of a flexible "bean bag". Thereby, the camera may be supported by placing the underside of the plate on the top side of the "bean bag" where the camera may be adjustably but securely disposed with further adjustment being attainable by shifting the disposition of the bolt through the plate.

It is apparent that numerous innovations for support devices for cameras have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for supporting a camera on a surface that avoids the disadvantages of the prior art.

ANOTHER OBJECT of the present invention is to provide a device for supporting a camera on a surface that is simple and inexpensive to manufacture.

STILL ANOTHER OBJECT of the present invention is to provide a device for supporting a camera on a surface that is simple to use.

BRIEFLY STATED, YET ANOTHER OBJECT of the present invention is to provide a device for supporting a camera. The device includes a cushion, a strap, and apparatus. The cushion has a pocket disposed on the upper surface thereof, at one corner thereof. The upper surface of the strap has a first portion of hook and loop fasteners thereon that are disposed on the pair of free terminal ends of the strap. The lower surface of the strap has a second portion of hook and loop fasteners thereon that are disposed on the pair of free terminal ends of the strap. The second portion of hook and loop fasteners on one free terminal end of the strap releasably mates with the first portion of hook and loop fasteners on the other free terminal end of the strap so as to allow either free terminal end of the strap to overlap and engage the other free terminal end of the strap. The apparatus includes a third portion of hook and loop fasteners that is disposed on the upper surfaces of the cushion, a bolt for threadably engaging in the camera, and a fourth portion of hook and loop fasteners that covers the head of the bolt and releasably engages the third portion of hook and loop fasteners. The bolt is stored under the pocket on the upper surface of the cushion when not in use.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention in use;

FIG. 2 is an enlarged diagrammatic perspective view of the area generally enclosed by the dotted curve identified by arrow 2 in FIG. 1 of the present invention;

FIG. 3 is an enlarged diagrammatic top plan view taken generally in the direction of arrow 3 in FIG. 2;

FIG. 4 is a diagrammatic side elevational view taken generally in the direction of arrow 4 in FIG. 3; and FIG. 5 is an enlarged diagrammatic perspective view of the area generally enclosed by the dotted curve identified by arrow 5 in FIG. 4 of the attaching screw of the present invention.

LIST OF REFERENCE NUMERALS UTILIZED IN THE DRAWING device of the present invention for supporting camera 12 on one of surface 14 and object 15
camera
surface
object
cushion for supporting camera 12
strap assembly
apparatus for releasably attaching camera 12 to cushion 16
lower surface of cushion 16 for facing one of surface 14 and object 15
upper surface of cushion 16 for facing camera 12
at least one corner of cushion 16
pocket on cushion 16
strap of strap assembly 18
upper surface of strap 30 of strap assembly 18
lower surface of strap 30 of strap assembly 18
pair of free terminal ends of strap 30 of strap assembly 18
first portion of hook and loop fasteners on upper surface 32 of strap 30 of strap assembly 18
second portion of hook and loop fasteners on lower surface 34 of strap 30 of strap assembly 18
third portion of hook and loop fasteners of apparatus 20
bolt of apparatus 20
head of bolt 44 of apparatus 20
threaded shaft of bolt 44 of apparatus 20 for threadably engaging in camera 12 and being stored in pocket 28 on upper surface 24 of cushion 16 when not in use
fourth portion of hook and loop fasteners of apparatus 20

DETAILED DESCRIPTION OF THE PREFERRED EMBODIMENT

Referring now to the figures, in which like numerals indicate like parts, and particularly to FIG. 1, the device of the present invention is shown generally at 10 for supporting a camera 12 on one of a surface 14 with a contour and an object 15 with a contour.

The configuration of the device 10 can best be seen in FIGS. 2–5, and as such, will be discussed with reference thereto.

The device 10 comprises a cushion 16 for supporting the camera 12, a strap assembly 18 extending from the cushion 16, and apparatus 20 for releasably attaching the camera 12 to the cushion 16.

The cushion 16 is filled with cushioning and deforming matter for providing a cushion for the camera 12 and for assuming the contour of one of the surface 14 and the object 15.

The cushion 16 has a lower surface 22 for facing one of the surface 14 and the object 15, an upper surface 24 for facing the camera 12, at least one corner 26, and a pocket 28 disposed on the upper surface 24 of the cushion 16, at one of the at least one corner 26 of the cushion 16 and storing a portion of the apparatus 20 when not in use.

The strap assembly 18 comprises a strap 30 that extends from the lower surface 22 of the cushion 16, at diametrically opposite sides thereof, and at different lengths therefrom.

The strap 30 of the strap assembly 18 has an upper surface 32, a lower surface 34, and a pair of free terminal ends 36.

The upper surface 32 of the strap 30 has a first portion of hook and loop fasteners 38 thereon that are disposed on the pair of free terminal ends 36 of the strap 30.

The lower surface 34 of the strap 30 has a second portion of hook and loop fasteners 40 thereon that are disposed on the pair of free terminal ends 36 of the strap 30.

The second portion of hook and loop fasteners 40 on one free terminal end 36 of the strap 30 releasably mates with the first portion of hook and loop fasteners 38 on the other free terminal lend 36 of the strap 30 so as to allow either free terminal end 36 of the strap 30 to overlap and engage the other free terminal end 36 of the strap 30 when the strap 30 is utilized to hold the cushion 16 on the object 15, and thereby eliminating a need to think about which free terminal end 36 of the strap 30 has to go on top of the other free terminal end 36 of the strap 30.

The apparatus 20 comprises a third portion of hook and loop fasteners 42 that is disposed centrally on the upper surfaces 24 of the cushion 16.

The apparatus 20 further comprises a bolt 44 that has a head 46 and a threaded shaft 48 that extends from the head 46 of the bolt 44 for threadably engaging in the camera 12.

The apparatus 20 further comprises a fourth portion of hook and loop fasteners 50 that covers the head 46 of the bolt 44 and releasably engages the third portion of hook and loop fasteners 42, with the bolt 44 being stored in the pocket 28 on the upper surface 24 of the cushion 16 when not in use.

It will be understood that each of the elements described. above, or two or more together, may also find a useful application in other types of constructions differing from the types described above.

While the invention has been illustrated and described as embodied in a device for supporting a camera on a surface, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for supporting a camera on one of a surface with a contour and an object with a contour, comprising:

a) a cushion for supporting the camera; said cushion having:
  i) a lower surface for facing one of the surface and the object;
  ii) an upper surface for facing the camera; and
  iii) at least one corner;
b) a strap assembly extending from said cushion; said strap assembly comprising a strap extending from said lower surface of said cushion, at diametrically opposite sides thereof, and at different lengths therefrom: said strap of said strap assembly having:
  i) an upper surface;
  ii) a lower surface; and
  iii) a pair of free terminal ends; said upper surface of said strap having a first portion of hook and loop fasteners thereon being disposed on each of said pair of free terminal ends of said strap; said lower surface of said strap having a second portion of hook and loop fasteners thereon being disposed on each of said pair of free terminal ends of said strap; said second portion of hook and loop fasteners on one free terminal end of said strap releasably mating with said first portion of hook and loop fasteners on the other free terminal end of said strap so as to allow either free terminal end of said strap to overlap and engage said other free terminal end of said strap when said strap is utilized to hold said cushion on the object, and thereby eliminating a need to think about which free terminal end of said strap has to go on top of the other free terminal end of said strap; and
c) apparatus for releasably attaching the camera to said cushion; said apparatus comprising:
  i) a third portion of hook and loop fasteners being disposed centrally on said upper surfaces of said cushion; said cushion further having a socket disposed on said upper surface of said cushion, at one of said at least one corner of said cushion and storing a portion of said apparatus when not in use;
  ii) a bolt having:
    A) a head; and
    B) a threaded shaft extending from said head of said bolt for threadably engaging in the camera; and
  iii) a fourth portion of hook and loop fasteners covering said head of said bolt and releasably engaging said third portion of hook and loop fasteners, with said bolt being stored in said pocket on said upper surface of said cushion when not in use.

2. The device as defined in claim 1, wherein said cushion is filled with cushioning and deforming matter for providing a cushion for the camera and for assuming the contour of one of the surface and the object.

* * * * *